US006984303B2

(12) United States Patent
Kern et al.

(10) Patent No.: US 6,984,303 B2
(45) Date of Patent: Jan. 10, 2006

(54) ELECTROCHEMICAL PRODUCTION OF DYES USING GRAPHITE FELT ELECTRODES

(75) Inventors: Joseph D. Kern, Cincinnati, OH (US); Gene P. Wesseler, Sharonville, OH (US)

(73) Assignee: Noveon IP Holdings Corp., Cleveland, OH (US)

( * ) Notice: Subject to any disclaimer, the term of this patent is extended or adjusted under 35 U.S.C. 154(b) by 139 days.

(21) Appl. No.: 10/373,901

(22) Filed: Feb. 25, 2003

(65) Prior Publication Data

US 2004/0163968 A1    Aug. 26, 2004

(51) Int. Cl.
C25B 3/00 (2006.01)
C25F 1/00 (2006.01)
C30B 7/12 (2006.01)

(52) U.S. Cl. .................. 205/413; 205/688; 205/691; 205/770

(58) Field of Classification Search ............. 205/413, 205/688, 691, 770
See application file for complete search history.

(56) References Cited

U.S. PATENT DOCUMENTS 3,925,172 A * 12/1975 Voorhies ................. 205/431
4,775,451 A * 10/1988 Habermann et al. ........ 205/436
2003/0098246 A1 * 5/2003 Merk et al. ............... 205/687

FOREIGN PATENT DOCUMENTS

DE    19641344    10/1996

OTHER PUBLICATIONS

White et al., "The Electrolytic Oxidation of Leuco Bases of the Triphenylmethane Series of Dyestuff", Transaction of the Electrochemical Society (no month, 1932), vol. 61, 12 pp. (abstract only).*
White et al., "The Electrolytic Oxidation of Leuco Bases of the Triphenylmethane Series of Dyestuff", Transaction of the Electrochemical Society (no month, 1932), vol. 61, 12 pp. (English translation).*
Energy Research and Generation, Inc., Oakland, California, Reticulated Vitreous Carbon product brochure, no date.
Chemical Abstracts, vol. 92, 1980, No. 163717c, Japanese Publication No. 130481/1979, no month.
Peacock, et al., Tetrahedron Letters 41 (2000); pp. 8995-8998, "The Electrosynthesis of Diaryliodonium Salts", no month.
Ragnini, et al., Water Research vol. 34, No. 13, pp. 3269-3276, 2000; "Recycled Niobium Felt as an Efficient Three-Dimensional Electrode for Electrolytic Metal Ion Removal", no month.
Uchiyama, et al., Saitama Kogyo Daiguku Kiyo, vol. 8, pp. 45-51, 1999, "Formation of Aniline-Bonded Catechols in Aqueous Solution, And Their Electrochemical Behaviors at Carbon Felt Electrode", no month.
Lorans, et al., Acta Chemica Scandanavica, vol. 53, pp. 807-813, 1999, "Electrosynthesis of Cyclic α-Carbonylazo Compounds. Chemical Stability of the Electrogenerated Dienophiles and In Situ Trapping of Dienes", no month.
Gattrell, et al., Journal of the Electrochemical Society, vol. 146, No. 9, pp. 3335-3348, 1999, "The Anodic Electrochemistry of Pentachlorophenol", no month.
Gomis, et al., Journal of Applied Electrochemistry, vol. 29, pp. 265-270, 1999, "Electrosynthesis of p-hydroxybenzaldehyde From Sodium p-hydroxymandelate", no month.
Electrocell AB, Akersberga, Sweden, The SU Electro Cell Programme brochure, no date.

* cited by examiner

*Primary Examiner*—Edna Wong
(74) *Attorney, Agent, or Firm*—Joe A. Powell; Steven J. Goldstein; Thoburn T. Dunlap

(57) ABSTRACT

An electrochemical process for the preparation of water-soluble colorants, particularly triphenylmethane colorants and other water soluble technical dyes, is disclosed. In this process, the anode in the electrochemical cell comprises an open pore carbon material having specific void volume and surface area characteristics. A preferred electrode material is a carbon felt pad, preferably between about 1/16 inch and 1/4 inch in thickness. This process provides faster reaction rates than electrochemical processes using standard electrodes, as well as higher yields compared to processes using chemical oxidizing agents.

15 Claims, No Drawings

ELECTROCHEMICAL PRODUCTION OF DYES USING GRAPHITE FELT ELECTRODES

TECHNICAL FIELD

The present invention relates to an electrochemical oxidation process for the production of colorants, particularly triphenylmethane colorants.

BACKGROUND OF THE INVENTION

Triphenylmethane (TPM) dyes have been historically produced in industry using chemical oxidizing agents like sodium dichromate, lead dioxide and manganese dioxide. While such processes are well known and are practiced in industry, the use of such chemical oxidizing agents can present environmental and waste disposal issues which, in order to be handled effectively, increase the costs for the practice of the process. One of the main advantages of an electrochemical process is that such processes use electricity to drive the reaction rather than using reactive chemicals. Electrochemistry eliminates the hazardous handling of these chemicals, the cost of buying them, and the final disposal costs of the spent metal byproducts. This an excellent example of "green chemistry" which strives to develop environmentally benign processes.

It has been shown in the literature (U.S. Pat. No. 4,775,451, Habermann, et al., issued Oct. 4, 1988) that TPM dyes can be formed by the electrochemical oxidation of their corresponding leuco dyes using expensive electrodes coated with precious metal catalysts. The anodes utilized in the Habermann, et al. process are made from metals, such as titanium, tantalum or niobium, surface doped with metal oxides. The patent teaches that the surface of the electrodes should not be roughened (see column, lines 38–40, and column 4, lines 29–34). The patent also teaches that the presence of low levels of a $C_2$–$C_4$ alcohol, urea, a urea derivative, or a mixture of those materials in the solution being oxidized will produce high yields of high purity TPM colorants.

The use of graphite carbon felt anodes has been disclosed for several types of electrosynthesis reactions. See, for example, Peacock, et al., Tetrahedron Letters (2000), 41(46): 8995–8998. However, such electrodes have not heretofore been taught for use in oxidation reactions for the formation of colorants, and triphenylmethane colorants in particular.

The present invention provides an electrochemical oxidation process for the preparation of colorants, particularly triphenylmethane colorants, using graphite carbon felt electrodes. Surprisingly it has been found that the use of such electrodes in this process provides reaction rates which can be as much as ten times faster than the rates found using precious metal flat electrodes, and can provide process yields as much as ten or fifteen percent greater than current plant processes utilizing chemical oxidizing agents such as manganese dioxide. These excellent results are accomplished using electrodes which are considerably less expensive than the precious metal electrodes described in U.S. Pat. No. 4,775,451. Additionally, the improved reaction yields and reduced cycle times allow the oxidation to take place in smaller or fewer electrochemical cells thereby greatly reducing capital costs for colorant production. Finally, the present invention allows for the synthesis of colorants, particularly TPM colorants, without requiring the use of chemical oxidizing agents, thereby eliminating any environmental or safety considerations regarding the use or disposal of such agents.

SUMMARY OF THE INVENTION

The present invention relates to an electrolytic process for the preparation of a water-soluble colorant (for example, a triphenylmethane colorant) by anodically oxidizing the leuco compound corresponding to said colorant, comprising the improvement wherein the anode comprises an open pore carbon material having a void volume of at least about 90% and a surface area of at least about 100 $cm^2/cm^3$. A preferred material for use in this process comprises a graphite carbon felt pad having a thickness of from about 1/32 of an inch to about 1 inch, preferably about 1/8 inch.

The present invention also relates to a process for the preparation of a water-soluble triphenylmethane colorant (such as a diaminotriphenylmethane containing from two to four sulfo groups) comprising anodically oxidizing the leuco compound corresponding to said colorant in an electrolysis cell divided into an anode space and a cathode space, wherein the anode in said cell comprises an open pore graphite carbon felt pad.

All percentages and ratios stated herein are "by weight" unless otherwise specified.

All patents and literature references described herein are incorporated by reference into this patent application.

DETAILED DESCRIPTION OF THE INVENTION

The process according to the present invention is carried out by introducing a solution of the leuco dye into the anode space of an electrolysis cell which is divided into two and is equipped with an anode which comprises an open pore carbon material, such as graphite carbon felt or reticulated vitreous carbon, backed with a solid anode for electrical contact. The cathode space contains an electrically conductive solution, preferably a mineral acid. Electrolysis is carried out at a potential of from about 1 to about 4 volts, preferably from about 2 to about 2.5 volts.

The process of the present invention may be used for the preparation of any water soluble colorant which is prepared by the oxidation of the leuco version of the final compound. Examples of such colorants include triphenylmethanes, fluorans, xanthenes, azines, oxazines, and related dyes. These classes of colorants are all well known in the art. The reaction is particularly useful for the preparation of triphenylmethane colorants, and particularly diaminotriphenylmethane colorants containing from two to four sulfo groups. Examples of materials which may be made using the process of the present invention include Acid Blue 9 (C.I. 42090) [2650-18-2], FD&C Blue 1 (C.I. 42090) [3844-45-9], Wool Violet (C.I. 42650), [4129-84-4], FD&C Green No. 3 (C.I. 42053) [2353-45-9], and related dyes.

The anolyte solution is generally an aqueous solution which typically contains from about 2% to about 50%, preferably from about 10% to about 20%, of the leuco colorant material. The anolyte solution may additionally contain from about 0.5% to about 25% of an ionizable salt material, preferably sodium chloride. The presence of this salt tends to increase the yields provided by the process of the present invention. The flow rates of both the anolyte and the catholyte through the cell are relatively high. Pumps are typically used in an electrolysis cell to circulate the anolyte and catholyte. High flow rate is important in the present invention since these dyes can easily be overoxidized if left in contact with the anode for too long a period of time.

The catholyte is an electrically conductive aqueous solution. Preferred materials for use as the catholyte are mineral acids, such as dilute sulfuric acid.

A key aspect of the present invention is the nature and identity of the anode. The anode is comprised of an open pore carbon material, such as graphite carbon felt or reticulated vitreous carbon, backed with a solid anode for electrical contact. Examples of such materials include reticulated carbon electrodes and open pore graphite carbon felt pads. Preferred for use in the present invention are open pore carbon felt pads, typically having a thickness of from about 1/32 inch to about 1 inch, preferably from about 1/16 inch to about 1/2 inch, most preferably about 1/8 inch. They typically have a void volume of at least about 90% (preferably at least about 95%) and a surface area of at least about 100 $cm^2/cm^3$. In a typical anode, a solid electrode, preferably graphite, is used to distribute the electrical current throughout the felt which is held against the surface of the solid graphite. Another example of material useful in the present invention is reticulated vitreous carbon (RVC), commercially available from Electrolytica, Inc., 87 Westwind Lane, Amherst N.Y. 14228. RVC is an open pore foam material composed solely of vitreous carbon. Vitreous carbon is a form of glass-like carbon which combines some of the properties of glass with some of those of normal industrial carbons. RVC has a very high void volume (about 97%) and high surface area combined with cell-supporting rigidity, low resistance to fluid flow, and resistance to very high temperatures in nonoxidizing environments.

Any standard material, such as stainless steel, may be used to form the cathode in the present invention.

Organic anion and cation exchange membranes have proven useful for separating the anode space and the cathode space. Examples of suitable ion exchangers are polymers and copolymers of styrene, styrene and divinylbenzene, styrene and maleic anhydride, acrylates and divinylbenzene, olefins, perfluorinated olefins, and vinyl chloride and acrylonitrile, which carry sulfo groups and/or primary, secondary or tertiary amino groups or quaternary ammonium groups as charge-carrying groups.

It is preferable to use cation exchange membranes and dilute sulfuric acid as the catholyte. The concentration of the sulfuric acid is preferably from about 2% to about 20% by weight.

Aqueous solutions of the leuco compounds are used as anolytes. The concentration of the leuco compounds in the anolyte is as a rule from about 2% to about 50%, preferably from about 10% to about 20% by weight, based on the solution. The anolytes may additionally include ionizable salts, and particularly sodium chloride, at a level of from about 0.5 to about 25% of the solution.

The process of the electrolysis reaction is preferably followed by use of a spectrophotometer to measure the increase in color. When no more color intensity is seen, the oxidation is stopped.

The anodic oxidation of the leuco compounds is carried out in a temperature range of from about 0° C. to about 90° C., preferably from about 25° C. to about 30° C. External cooling coils may be used to remove the heat of reaction and maintain the desired temperature.

The following examples are intended to be illustrative of the process of the present invention and not limiting thereof.

EXAMPLES

Example 1

To an anolyte reservoir was added 1299 g of 10.75% Acid Blue 9 leuco. This was recirculated through an SU Electro MP Cell manufactured by ElectroCell AB (Sweden) using a centrifugal pump with a ½ HP motor. As it was recirculating, the pH was lowered to 3.4, and 161 g of sodium chloride was added. To the catholyte reservoir was added 1300 g of a solution containing 60 g of sulfuric acid, 160 g of sodium sulfate and 1080 g of water. A DC power supply (model 100B from Rapid Electric Co.) was set to maintain 4.0 amps to the MP cell which contained two 4×4×⅛ inch graphite felt pads (GF graphite felt, commercially available from Electrolytica, Inc., 87 Westwind Lane, Amherst N.Y. 14228) on both sides of a solid graphite anode. The cathode consisted of two 4×4 inch stainless steel electrodes. The temperature was maintained between 24° C. and 27° C. throughout the oxidation and the pH was held above 2 with 50% sodium hydroxide. The voltage ranged from 2.0 volts at the start of the electrooxidation to 2.2 volts at the end. The current was shut off after 158 minutes, at which time the strength of the dye (Acid Blue 9) being produced ceased going higher. The dye solution was removed from the unit and found to contain 139.5 g of Acid Blue 9 or close to a 100% yield.

Example 2 (Comparative)

To an anolyte reservoir was added 651 g of 10.75% Acid Blue 9 leuco. This was recirculated through an Electro MP Cell manufactured by ElectroCell AB using a centrifugal pump with a ½ HP motor. As the anolyte was recirculating, 81 g of sodium chloride was added and the pH lowered to 3.4. To the catholyte reservoir was added 1300 g of a solution containing 60 g of sulfuric acid, 160 g of sodium sulfate and 1080 g of water. A DC power supply (model 100B from Rapid Electric Co.) was set to maintain 4.2 amps to the MP cell which contained only a solid 4×4 inch graphite anode—both sides of which were used. The cathode consisted of two 4×4 inch stainless steel electrodes. The temperature was maintained between 24° C. and 29° C. throughout the oxidation and the pH was held above 2 with 50% sodium hydroxide. The voltage ranged from 2.5 volts at the start of the electrooxidation to 3.1 volts at the end. The current was shut off after 40 minutes because the dye (Acid Blue 9) was being produced very slowly. The dye was removed from the unit and found to contain only 11.2 g of Acid Blue 9 or about a 15% conversion.

Example 3 (Comparative)

To an anolyte reservoir was added 1200 ml of 10% Acid Blue 9 leuco. This was recirculated through an Electro MP Cell manufactured by ElectroCell AB using a centrifugal pump with a ½ HP motor. To the catholyte reservoir was added 1200 ml of a solution containing 40 ml of sulfuric acid. A DC power supply (model 100B from Rapid Electric Co.) was set to maintain 1.75 amps to the MP cell which contained only a solid 4×4 inch platinum on titanium anode—both sides of which were used. The cathode consisted of two 4×4 inch stainless steel electrodes. The temperature was maintained between 35° C. and 45° C. throughout the oxidation. The voltage ranged from 2.2 volts at the start of the electrooxidation to 3.1 volts at the end. The current was shut off after 1680 minutes because the dye (Acid Blue 9) was being produced very slowly. The dye was removed from the unit and found to contain 100 g of Acid Blue 9 or about a 82% conversion.

The results obtained are summarized in the following table.

TABLE 1

Comparison of rates using different anodes

| Example | Anode used | Rate (grams/min of dye produced) | Conversion |
|---|---|---|---|
| 1 | 1/8" graphite felt on solid graphite | 0.87 | 100% |
| 2 | solid graphite only | 0.28* | 15% |
| 3 | smooth platinum on titanium | 0.06 | 82% |

*Rate is faster for the first 15% and slows as 100% is approached.

What is claimed is:

1. An electrolytic process for the preparation of a water-soluble colorant by anodically oxidizing the corresponding leuco compound comprising the improvement wherein the anode comprises an open pore carbon material having a void volume of at least about 90% and a surface area of at least about 100 $cm^2/cm^3$.

2. The process according to claim 1 wherein the colorant is selected from triphenylmethanes, fluorans, xanthenes, azines and oxazines.

3. The process according to claim 2 wherein said open pore carbon material is a carbon felt pad having a thickness of from about 1/32 inch to about 1 inch.

4. The process according to claim 3 wherein the colorant is a triphenylmethane.

5. The process according to claim 4 wherein the void volume of the open pore carbon material is at least about 95%.

6. A process for the preparation of a water-soluble triphenylmethane colorant comprising anodically oxidizing the corresponding leuco compound in an electrolysis cell divided into an anode space and a cathode space, wherein the anode in said cell comprises an open pore carbon felt pad having a void volume of at least about 90% and a surface area of at least about 100 $cm^2/cm^3$ and wherein said leuco compound is present in an anolyte solution.

7. The process according to claim 6 wherein the felt pad has a thickness of from about 1/32 inch to about 1 inch.

8. The process according to claim 7 wherein the anode is a graphite base covered at least in part by said carbon felt pad.

9. The process according to claim 7 wherein the anodic oxidation is carried out at an electrical potential of from about 1 to about 4 volts.

10. The process according to claim 9 wherein the anodic oxidation is carried out at a temperature of from about 0° C. to about 90° C.

11. The process according to claim 10 wherein the anodic oxidation is carried out at a temperature of from about 5° C. to about 30° C.

12. The process according to claim 10 wherein the anolyte solution contains from about 2% to about 50% of the leuco compound.

13. The process according to claim 12 wherein the anolyte solution contains the corresponding leuco compound of a colorant selected from Acid Blue 9 (C.I. 42090) [2650-18-2], FD&C Blue 1 (C.I. 42090) [3844-45-9], Wool Violet (C.I. 4265) [4129-84-4], FD&C Green No. 3 (C.I. 42053) [2353-45-9], and related dyes.

14. The process according to claim 12 wherein the anolyte solution additionally contains an ionizable salt at from about 0.5% to about 25%.

15. The process according to claim 14 wherein the ionizable salt is sodium chloride.

* * * * *